United States Patent
Jamison et al.

(10) Patent No.: US 9,771,050 B1
(45) Date of Patent: Sep. 26, 2017

(54) AIRBAG INFLATION TUNNELS AND RELATED SYSTEMS AND METHODS

(71) Applicant: Autoliv ASP, Inc., Ogden, UT (US)

(72) Inventors: Patrick Jamison, North Ogden, UT (US); Derrick R. Staheli, South Ogden, UT (US); Mark S. Hatfield, Providence, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 15/151,387

(22) Filed: May 10, 2016

(51) Int. Cl.
| | | |
|---|---|---|
| *B60R 21/23* | (2006.01) | |
| *B60R 21/2346* | (2011.01) | |
| *B60R 21/2338* | (2011.01) | |
| *B60R 21/203* | (2006.01) | |
| *B60R 21/2165* | (2011.01) | |
| *B60R 21/00* | (2006.01) | |

(52) U.S. Cl.
CPC ........ *B60R 21/2346* (2013.01); *B60R 21/203* (2013.01); *B60R 21/21656* (2013.01); *B60R 21/2338* (2013.01); *B60R 2021/0004* (2013.01); *B60R 2021/0032* (2013.01); *B60R 2021/23382* (2013.01)

(58) Field of Classification Search
CPC ............ B60R 21/2346; B60R 21/2338; B60R 21/203; B60R 21/21656; B60R 2021/23382; B60R 2021/0004; B60R 2021/0032
See application file for complete search history.

(56) References Cited

U.S. PATENT DOCUMENTS

| | | | | |
|---|---|---|---|---|
| 3,843,150 A * | 10/1974 | Harada | ................. | B60R 21/231 |
| | | | | 182/137 |
| 6,669,229 B2 * | 12/2003 | Thomas | ................ | B60R 21/205 |
| | | | | 280/732 |
| 7,325,830 B2 * | 2/2008 | Higuchi | ................ | B60R 21/233 |
| | | | | 280/738 |
| 8,308,191 B2 | 11/2012 | Hiruta et al. | | |
| 8,690,185 B2 * | 4/2014 | Yamaji | .................. | B60R 21/233 |
| | | | | 280/729 |
| 2003/0020266 A1 * | 1/2003 | Vendely | ................ | B60R 21/217 |
| | | | | 280/739 |
| 2008/0143086 A1 * | 6/2008 | Higuchi | ................ | B60R 21/233 |
| | | | | 280/736 |
| 2008/0303256 A1 * | 12/2008 | Williams | ............ | B60R 21/2338 |
| | | | | 280/742 |

(Continued)

*Primary Examiner* — Darlene P Condra
(74) *Attorney, Agent, or Firm* — Phillips Ryther & Winchester; Matthew D. Thayne

(57) ABSTRACT

Airbag cushion assemblies comprising an airbag inflation tunnel positioned within an airbag cushion. Some embodiments may comprise an airbag cushion comprising an inflator opening and an airbag inflation tunnel coupled to the airbag cushion. The inflation tunnel may be configured to direct inflation gas from an inflator positioned within the inflator opening down the airbag inflation tunnel upon deployment of the inflator. A plurality of directional vent openings may be positioned within the airbag inflation tunnel that may be configured to direct the inflation gas laterally relative to the inflator. The inflation tunnel may further be configured such that the inflation gas contacts a terminal end of the inflation tunnel prior to exiting the plurality of directional vent openings.

16 Claims, 5 Drawing Sheets

(56) References Cited

U.S. PATENT DOCUMENTS

2014/0138939 A1* 5/2014 Scott ................... B60R 21/207
  280/736
2014/0284905 A1* 9/2014 Yamaji ................ B60R 21/239
  280/729

* cited by examiner

AIRBAG INFLATION TUNNELS AND RELATED SYSTEMS AND METHODS

SUMMARY

Airbag cushion inflation often results in cushion "bounce." In other words, for driver-side airbags, for example, the forces associated with airbag inflation often cause the cushion to deflect off of the steering wheel and deliver high forces directly towards a driver. In addition, airbags often inflate by inflating the central part of the cushion before the lateral sides of the cushion.

The present inventors have therefore determined that it would be desirable to provide systems and methods that overcome one or more of the foregoing limitations and/or other limitations of the prior art by, in some embodiments, providing airbag cushion assemblies that include an inflation tunnel that may allow inflation gas to fill the cushion radially or laterally during an earlier stage of inflation. Such radial inflation and/or other beneficial aspects of one or more embodiments disclosed herein may reduce forces delivered to an occupant, reduce cushion bounce, reduce occupant travel during a vehicle crash, provide a more desirable foundation for the airbag during an early stage of deployment, and/or otherwise improve upon the prior art. Various airbag inflation tunnels disclosed herein may also, or alternatively, act as inflation tethers, control airbag deployment distances, reduce fabric uses and/or costs, and/or allow for tuning of airbag deployment characteristics.

In a more particular example of an airbag cushion assembly according to some embodiments, the assembly may comprise an airbag cushion comprising an inflator opening. The assembly may further comprise an airbag inflation tunnel coupled to the airbag cushion about the inflator opening. The inflation tunnel may be configured to direct inflation gas from an inflator positioned within the inflator opening down the airbag inflation tunnel upon deployment of the inflator. The inflation tunnel may further be configured to at least substantially prevent the inflation gas from being directed laterally within the airbag cushion immediately adjacent to the inflator such that the inflation gas must travel within the airbag inflation tunnel upon deployment of the inflator prior to entering a primary inflation chamber of the airbag cushion. The inflation tunnel may further comprise a plurality of directional vent openings positioned within the airbag inflation tunnel configured to direct the inflation gas laterally relative to the inflator. The inflation tunnel may further be configured such that the inflation gas contacts a terminal end of the inflation tunnel prior to exiting the plurality of directional vent openings.

In some embodiments, the inflation tunnel may comprise a base configured to define a full perimeter adjacent to the inflator so as to prevent the inflation gas from being directed laterally within the airbag cushion immediately adjacent to the inflator.

In some embodiments, at least a subset of the plurality of directional vent openings may be evenly distributed from a cross-sectional view of the inflation tunnel taken perpendicular to an elongated length of the inflation tunnel. In some such embodiments, the plurality of directional vent openings may comprise a first set of vent openings extending along the length of the inflation tunnel; a second set of vent openings extending along the length; and a third set of vent openings extending along the length, wherein the first set of vent openings is spaced from the second set of vent openings by at least about 120 degrees from the cross-sectional view, wherein the second set of vent openings is spaced from the third set of vent openings by at least about 120 degrees from the cross-sectional view, and wherein the third set of vent openings is spaced from the first set of vent openings by at least about 120 degrees from the cross-sectional view. Of course, a variety of alternative embodiments and implementations are contemplated, including but not limited to providing a first set of vent openings and a second set of vent openings spaced by about 180 degrees relative to the first set, or the holes may be grouped together more closely, depending upon the desired deployment characteristics.

In some embodiments, the inflation tunnel may be directly coupled to an inner surface of the airbag cushion. Alternatively, a tether may be coupled to an inner surface of the airbag cushion and coupled to the inflation tunnel. In some such embodiments, the tether may be coupled to an inner surface of the airbag cushion directly opposite from the inflator such that the tether is configured to be at least substantially aligned with the inflation tunnel during inflation of the airbag cushion.

In some embodiments, the inflation tunnel may be defined by a rectangular panel. In implementations of methods for manufacturing such an inflation tunnel, opposing sides of the panel may be aligned and sewn or otherwise coupled together to define a tubular structure. In some such embodiments and/or implementations, a flap may be sewn to one end of the tubular structure to define a closed terminal end.

In some embodiments, the inflation tunnel may comprise a base and a closed tip opposite from the base, and the inflation tunnel is configured such that, upon inflation of the airbag cushion, the inflation gas is forced to contact the closed tip before exiting the inflation tunnel. In some embodiments, the inflation tunnel may comprise a length between the base and the tip, and the length may be between about 200 mm and about 300 mm.

In another specific example of an airbag cushion assembly according to other embodiments, the assembly may comprise an airbag cushion comprising an inflator opening. The assembly may further comprise an elongated airbag inflation tunnel coupled to the airbag cushion. The airbag inflation tunnel may comprise a base and a tip opposite from the base along a length of the airbag inflation tunnel, wherein the airbag inflation tunnel is coupled to the airbag cushion along the base. The airbag inflation tunnel may be configured to direct inflation gas from an inflator positioned within the inflator opening down the airbag inflation tunnel upon deployment of the inflator. In some embodiments, the tip may comprise a first width in a direction perpendicular from the length, and the base may comprise a second width in a direction perpendicular from the length, wherein the second width is greater than the first width. For example, in some such embodiments, the inflation tunnel may taper from the base to the tip, such as a closed tip in some embodiments, such that a width of the inflation tunnel gradually decreases from the base to the tip, or at least along a portion of the length between the base and the tip.

Some embodiments may further comprise a plurality of directional vent openings positioned within the airbag inflation tunnel. In some embodiments, the inflation tunnel may be configured to at least substantially prevent the inflation gas from being directed laterally within the airbag cushion immediately adjacent to the inflator such that the inflation gas must travel within the airbag inflation tunnel upon deployment of the inflator prior to entering a primary inflation chamber of the airbag cushion. The plurality of directional vent openings may be configured to distribute inflation gas laterally relative to the inflator and symmetrically from a cross-sectional view of the inflation tunnel taken perpendicular to the length of the inflation tunnel. In some such embodiments, the plurality of directional vent openings may comprise a first set of vent openings; a second set of vent openings; and a third set of vent openings, wherein the first set of vent openings is spaced from the second set of vent openings by at least about 120 degrees from the cross-sectional view, wherein the second set of vent openings is spaced from the third set of vent openings by at least about 120 degrees from the cross-sectional view, and wherein the third set of vent openings is spaced from the first set of vent openings by at least about 120 degrees from the cross-sectional view.

In some embodiments, the inflation tunnel may comprise a frusto-conical shape.

The inflation tunnel may be configured such that, upon inflation of the airbag cushion, the inflation gas is forced to contact the closed tip before exiting the inflation tunnel.

Some embodiments may further comprise a cover configured to receive the airbag cushion. The cover may comprise a tear seam, and the airbag cushion may be positioned within the cover such that the inflation tunnel contacts the tear seam upon deployment of the airbag cushion to facilitate separation of the tear seam.

In another specific example of an airbag cushion assembly according to another embodiment, the assembly may comprise an airbag cushion comprising an inflator opening. The airbag cushion may define a primary inflation chamber. The assembly may further comprise an inflator extending into the inflator opening and an elongated airbag inflation tunnel coupled to the airbag cushion. The airbag inflation tunnel may be defined by a rectangular panel, and may comprise a base and a closed tip opposite from the base. The airbag inflation tunnel may be coupled to the airbag cushion along the base, and may be configured to direct inflation gas from the inflator down the airbag inflation tunnel upon deployment of the inflator. The inflation tunnel may further taper from the base to the tip such that a width of the inflation tunnel gradually decreases from the base to the tip. The inflation tunnel may further be configured to at least substantially prevent the inflation gas from being directed laterally within the airbag cushion immediately adjacent to the inflator such that the inflation gas must travel within the airbag inflation tunnel upon deployment of the inflator prior to entering the primary inflation chamber, and such that, upon inflation of the airbag cushion, the inflation gas is forced to contact the closed tip before exiting the inflation tunnel. The assembly may further comprise a plurality of directional vent openings positioned within the airbag inflation tunnel, wherein the plurality of directional vent openings are configured to distribute inflation gas from the inflator laterally relative to the inflator and symmetrically from a cross-sectional view of the inflation tunnel taken perpendicular to a length of the inflation tunnel extending between the base and the tip.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to airbag cushion assemblies including airbag inflation tunnels. Such tunnels may be configured to improve airbag cushion deployment characteristics, such as by reducing loads on occupants during deployment, reduce cushion "bounce," control deployment distances, etc.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
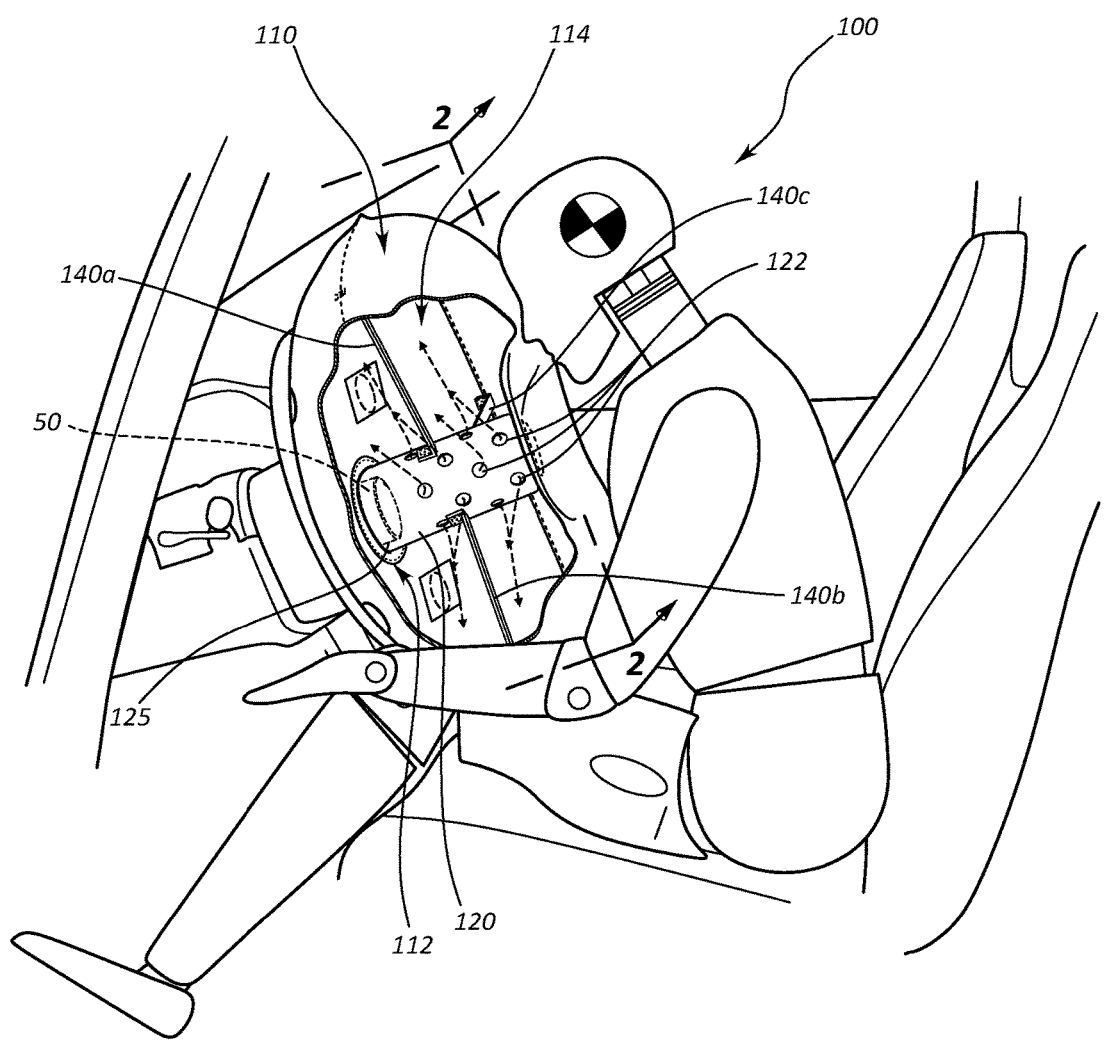
FIG. 1 depicts a partial breakaway view of an airbag cushion assembly comprising an airbag inflation tunnel according to one embodiment.

FIG. 1 depicts an airbag cushion assembly 100 according to some embodiments. Airbag cushion assembly 100 comprises an airbag cushion 110. Airbag cushion 110 comprises an opening 112, which may be configured to receive an inflator 50 therethrough for inflation of airbag cushion 110.

Airbag cushion assembly 100 further comprises an airbag inflation tunnel 120 coupled to the airbag cushion 110 about the inflator opening 112. Inflation tunnel 120 may be configured to direct inflation gas from an inflator 50 positioned within the inflator opening 112 down the airbag inflation tunnel 120 upon deployment of the inflator 50. In some embodiments, inflation tunnel 120 may be configured to at least substantially prevent the inflation gas from being directed laterally within the airbag cushion 110 immediately adjacent to the inflator and/or inflator opening 112 such that the inflation gas must travel within the airbag inflation tunnel 120 upon deployment of the inflator 50 prior to entering a primary inflation chamber 114 of airbag cushion 110.

Figure 2:
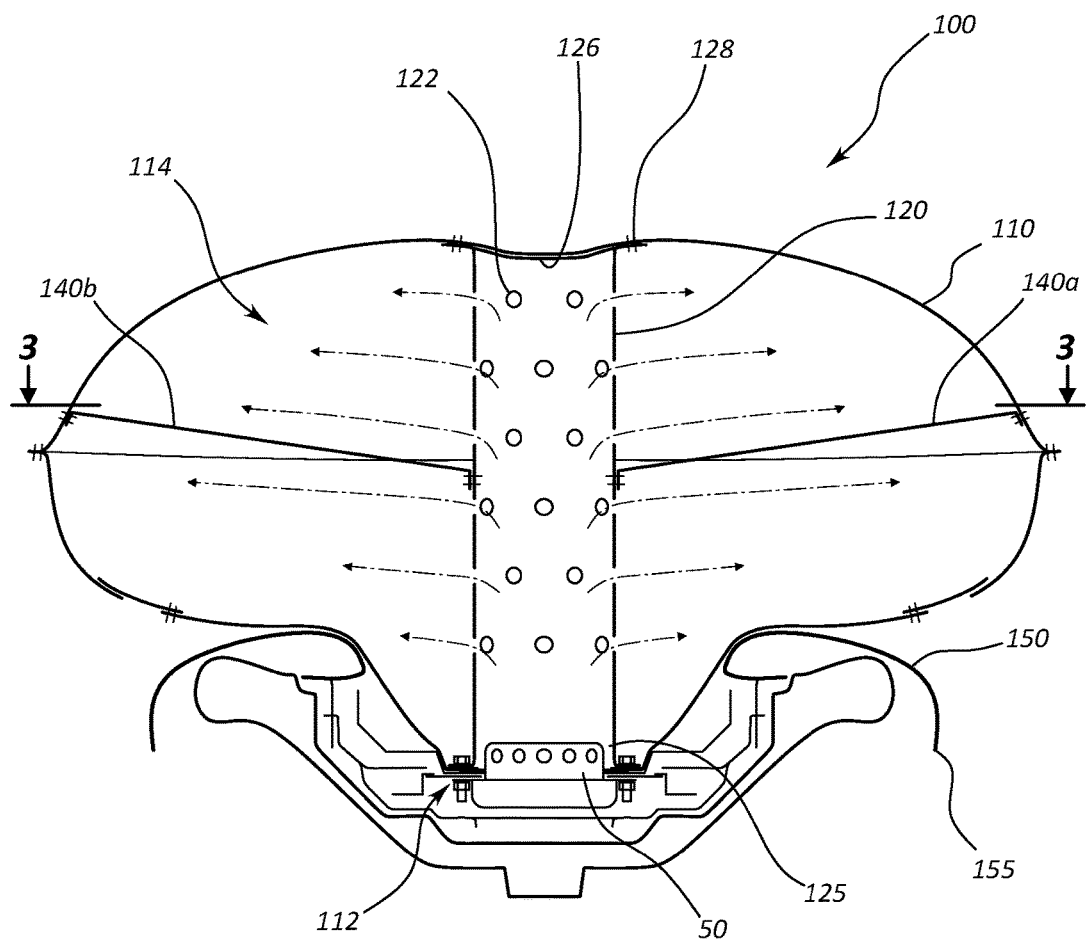
FIG. 2 is a cross-sectional view taken along line 2-2 in FIG. 1.

Thus, as best seen in FIGS. 1 and 2, upon entering airbag inflation tunnel 120, inflation gases cannot immediately enter primary inflation chamber 114. In the depicted embodiment, this is caused at least in part because the inflation tunnel 120 comprises a base 125 that defines a full perimeter adjacent to the inflator 50 and/or the opening 112 so as to prevent the inflation gas from being directed laterally within the airbag cushion immediately adjacent to the inflator 50.

Airbag inflation tunnel 120 comprises a plurality of directional vent openings 122 positioned within the airbag inflation tunnel 120. In the depicted embodiment, the plurality of directional vent openings 122 are configured to direct the inflation gas laterally relative to the inflator 50. In some embodiments, the airbag inflation tunnel 120 and vent openings 122 may be configured such that the inflation gas is at least substantially prevented from directly contacting a portion of the airbag cushion 110 directly opposite from the inflator 50. Thus, in some such embodiments, airbag inflation tunnel 120 may comprise a closed terminal end 126. As described in greater detail below, in some embodiments, airbag inflation tunnel 120 may comprise a closed flap defining terminal end 126. In some embodiments, including the embodiment of FIGS. 1-3, inflation tunnel 120 is configured such that the inflation gas contacts terminal end 126 of inflation tunnel 120 prior to exiting the plurality of directional vent openings 122. Embodiments comprising a closed terminal end may be configured such that, upon inflation of the airbag cushion, the inflation gas is forced to contact the closed tip before exiting the inflation tunnel (through the vent openings).

This may be useful for improving a variety of deployment conditions/problems, including, for example, reducing cushion "bounce," or the phenomenon of the cushion rebounding and contacting the steering wheel (for driver-side airbags) during and/or after inflation. Similarly, this may reduce forces experienced by a driver or other passenger during airbag deployment. In addition, this may provide for a more desirable foundation for airbag deployment, since the cushion will tend to deploy radially rather than directly contacting the occupant, in some embodiments closer to the deployment module, which may allow the cushion to be in better position and/or condition to receive the force of the occupant during deployment.

In some embodiments, the inflation tunnel, such as inflation tunnel 120, may comprise a length between the base and the tip, such as between base 125 and terminal, closed end 126 that may be between about 200 mm and about 300 mm in length. This length, however, may vary depending upon a wide variety of factors, including whether there is a terminal tether present, which will be discussed below in connection with FIG. 5.

In some embodiments, the inflation tunnel may be directly coupled to an inner surface of the airbag cushion. Thus, in the depicted embodiment, closed terminal end 126 of inflation tunnel 120 is directly sewn or otherwise coupled to the interior surface of airbag cushion 110 at 128. In this manner, inflation tunnel 120 may serve to limit the deployment length of airbag cushion 110 from inflator 50 towards the occupant. As described below, however, other embodiments are contemplated in which the inflation tunnel is indirectly coupled to the airbag cushion, such as by use of a terminal tether that may, for example, extend from a tip of the inflation tunnel to an interior surface of the airbag cushion opposite from the inflator. Still other embodiments are contemplated in which the inflation tunnel is closed only by virtue of its being coupled to the inside of an airbag cushion. In other words, some embodiments may lack a flap to close the terminal end. However, it may be preferred to provide such a flap to increase the strength of the cushion/tunnel at its terminal end where inflation gases will be expected to deliver the strongest forces.

Figure 3:
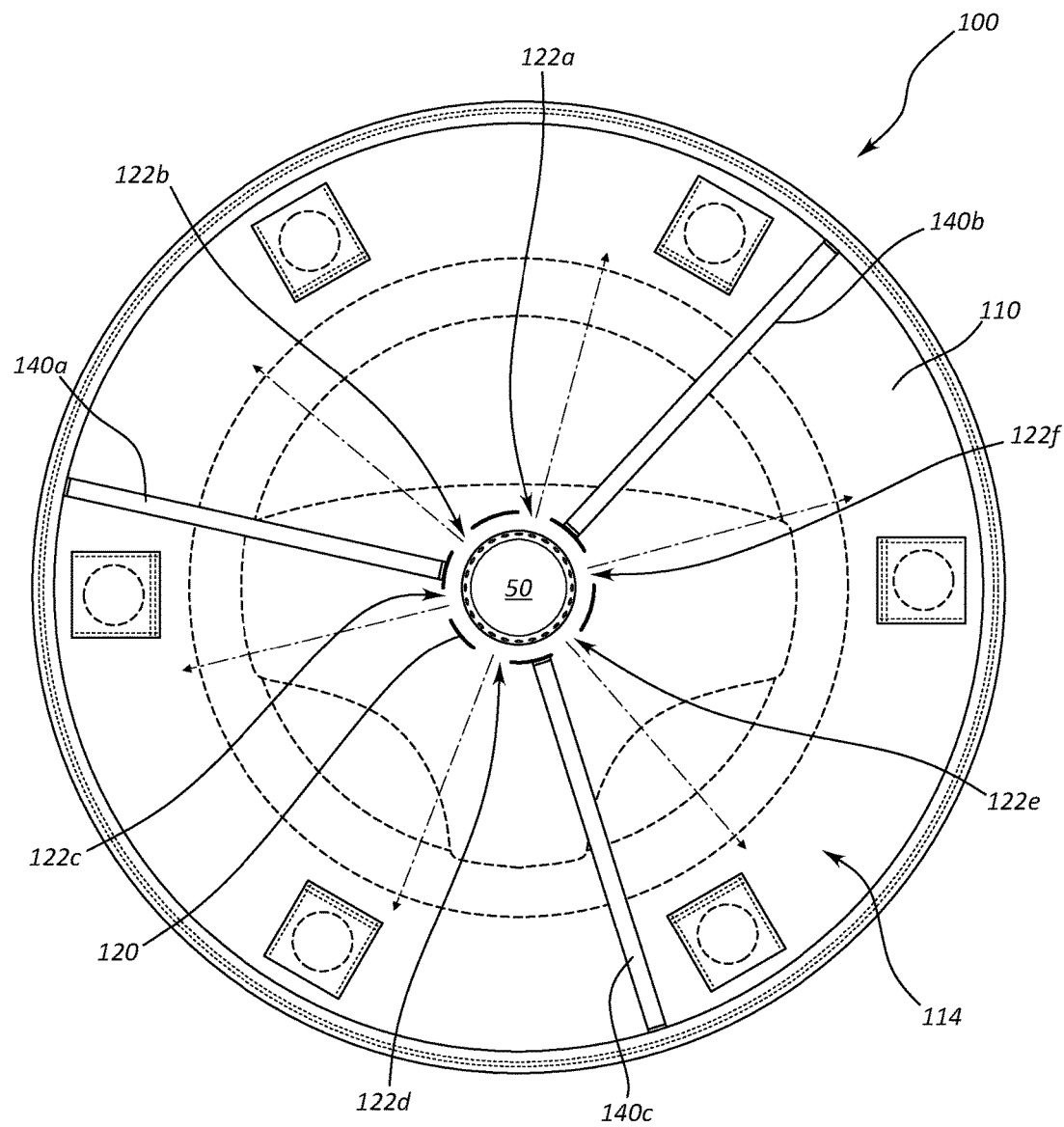
FIG. 3 is a cross-sectional view taken along line 3-3 in FIG. 2.

Some embodiments may comprise various tethers, some of which may be lateral tethers coupled to a lateral surface of the inflation tunnel, either in addition to, or instead of a terminal tip tether, as previously mentioned. For example, FIGS. 1-3 depict various lateral tethers 140a, 140b, and 140c, each of which is coupled to a lateral, internal surface of airbag cushion 110 at one end, and is coupled to a lateral surface of inflation tunnel 120 at its respective opposite end. Such tethers may allow for further tuning of desired airbag deployment characteristics.

In some embodiments, assembly 100 may further comprise a cover 150, which may be configured to receive airbag cushion 110 and from which airbag cushion 110 may be deployed, as shown in FIG. 2. In some such embodiments, the cover 150 may comprise a tear seam 155, and the airbag cushion 110 may be positioned within the cover 150 such that the inflation tunnel 120 will contact (typically indirectly) the tear seam 155 upon deployment of the airbag cushion 110 to facilitate separation of the tear seam 155. In other words, the directional force of inflation gas towards a particular location within airbag cushion 110 may also be used to separate a cover tear seam 155 by appropriately aligning the tear seam 155 with the expected location of airbag inflation tunnel 120 during deployment.

In some embodiments, lateral tethers 140 may be evenly spaced about the periphery of airbag inflation tunnel 120. For example, as shown in the cross-sectional view of FIG. 3, some embodiments may comprise three tethers spaced apart from one another by about 120 degrees from one another. However, other embodiments are contemplated in which different number of lateral tethers, or no tethers at all may be present. For example, in another contemplated embodiment, two lateral tethers may be used, each of which extends laterally from the other tether in an at least approximately opposite direction such that the tethers are spaced apart from one another radially by about 180 degrees.

Various sets of aligned vent openings may be similarly spaced apart from one another. For example, as also best shown in FIG. 3, several sets of vent openings are shown evenly distributed from a cross-sectional view of inflation tunnel 120 taken perpendicular to an elongated length of the inflation tunnel 120. More particularly, a first set of directional vent openings 122a, a second set of vent openings 122b, a third set of vent openings 122c, a fourth set of vent openings 122d, a fifth set of vent openings 122e, and a sixth set of vent openings 122f, each respectively extends along an elongated length of the inflation tunnel 120. Each of the various sets of vent openings is spaced apart from one another by about sixty degrees. Each of the various sets of vent openings may comprise a single vent opening or, alternatively may comprise a plurality of aligned vent openings extending at the same, or at least approximately the same, angle as the other vent openings in the set.

In other embodiments, other numbers of vent opening sets may be used. For example, in another preferred embodiment, three sets of vent openings may extend along the length of the inflation tunnel. In some such embodiments, the first set of vent openings is spaced from the second set of vent openings by at least about 120 degrees from the cross-sectional view, the second set of vent openings is spaced from the third set of vent openings by at least about 120 degrees from the cross-sectional view, and the third set of vent openings is spaced from the first set of vent openings by at least about 120 degrees from the cross-sectional view.

Figure 4A:
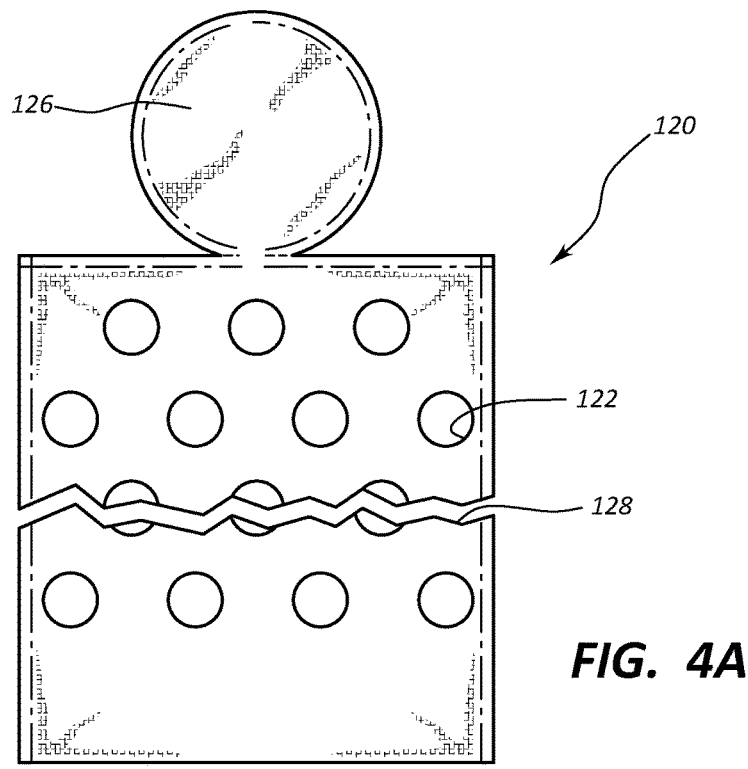
FIG. 4A depicts an embodiment of an airbag inflation tunnel in an early stage of an exemplary manufacturing method.
Figure 4B:
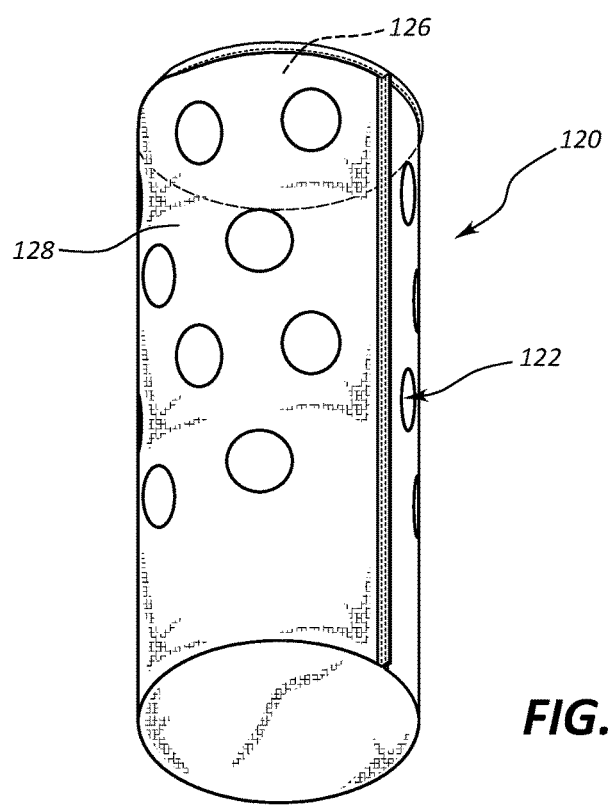
FIG. 4B depicts the airbag inflation tunnel of FIG. 4A in a later stage of an exemplary manufacturing method.

FIGS. 4A and 4B depict exemplary steps in an example of a method for manufacturing an airbag inflation tunnel 120 according to certain preferred embodiments and/or implementations. FIG. 4A depicts airbag inflation tunnel 120 comprising terminal flap 126 and rectangular panel 128. In a method step preliminary to the stage depicted in FIG. 4A, vent openings 122 may be formed. Of course, vent openings 122 may instead be formed during a later step if desired.

Following the stage depicted in FIG. 4A, rectangular panel 128 may be rolled or folded such that its opposing ends are aligned and then sewn or otherwise coupled together to define a tubular structure. Flap 126 may then be sewn to one end of rectangular panel 128 to define a closed terminal end, as previously mentioned. In alternative implementations, airbag inflation tunnel 120 may lack flap 126 and may instead be sewn or otherwise coupled directly to an interior surface of an airbag cushion, as previously mentioned.

Although FIGS. 4A and 4B depict the manufacture of an airbag inflation tunnel 120 defining a cylindrical tubular structure having an approximately constant cross-sectional diameter along its length between its base and its terminal end, other embodiments having different shapes and/or sizes are contemplated. For example, in some embodiments, as discussed below in connection with FIG. 5, the airbag inflation tunnel may comprise a tapering width extending along its length so as to, for example, define a frusto-conical shape.

Figure 5:
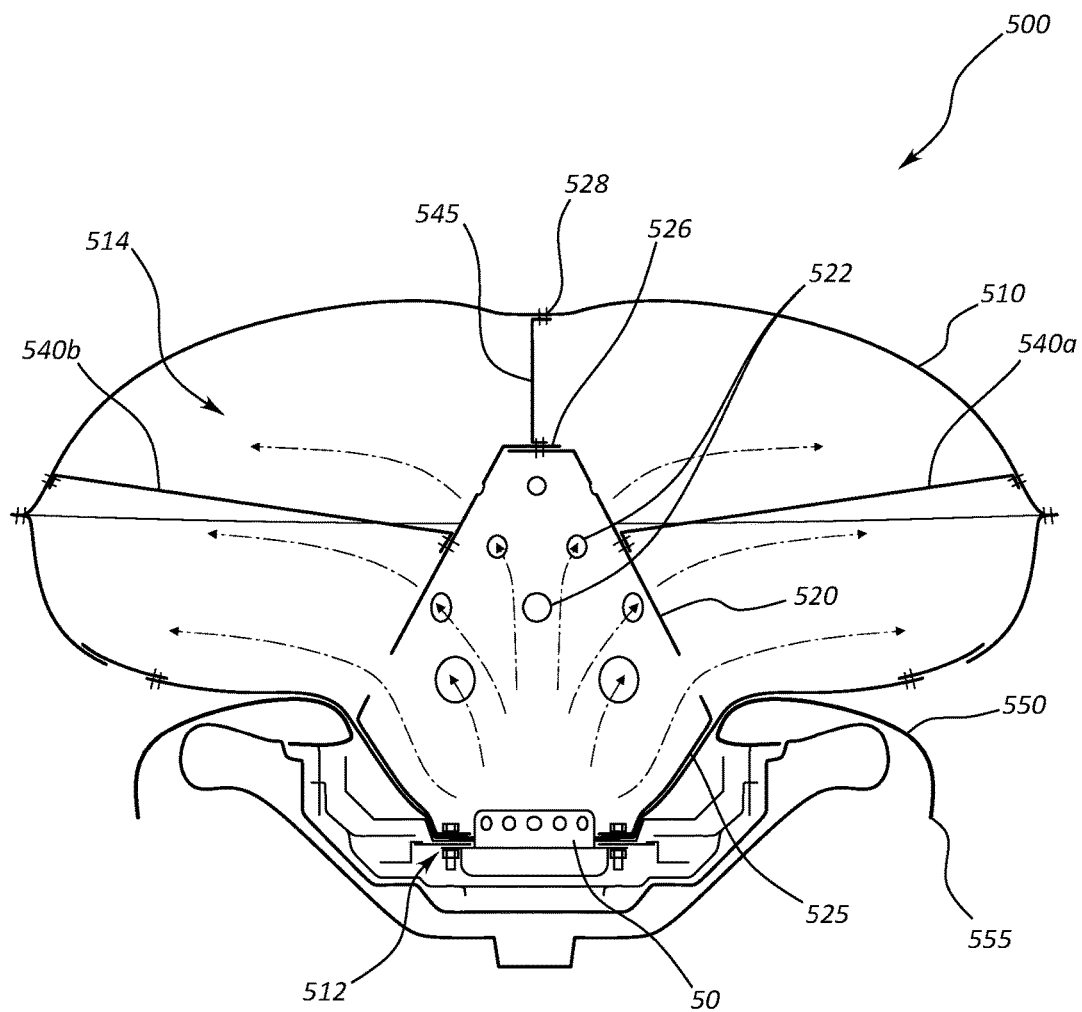
FIG. 5 depicts a partial breakaway view of an airbag cushion assembly comprising an airbag inflation tunnel according to an alternative embodiment.

FIG. 5 depicts another airbag cushion assembly 500 according to some embodiments. Airbag cushion assembly 500 comprises an airbag cushion 510 comprising an opening 512, which may be configured to receive an inflator 50 therethrough for inflation of airbag cushion 510.

Airbag cushion assembly 500 further comprises an airbag inflation tunnel 520 coupled to the airbag cushion 510 about the inflator opening 512. Inflation tunnel 520 differs from the previously-depicted inflation tunnels in that it tapers in cross-sectional diameter. More particularly, inflation tunnel 520 comprises a narrow, closed terminal end 526 that increases in width towards base 525. Base 525 defines a full perimeter adjacent to the inflator 50 and opening 512 so as to prevent the inflation gas from being directed laterally within the airbag cushion immediately adjacent to inflator 50. Although it may be preferred for some applications that this tapering extend from a wider diameter at or near the base of the airbag inflation tunnel, such as is depicted in FIG. 5, alternative embodiments are contemplated in which this tapering may extend in an opposite direction. However, it is preferred for most applications that the airbag inflation tunnel either taper from wide to narrow towards the tip, at least in part, or otherwise have a narrower tip than base, or that the airbag inflation tunnel have a constant diameter. In some embodiments, the airbag inflation tunnel may comprise a length extending between a base and a tip. The tip may comprise a first width in a direction perpendicular from the length, and the base may comprise a second width in a direction perpendicular from the length. In some such embodiments, the second width may be greater than the first width.

Assembly 500 further differs from the previously-depicted embodiments in that a terminal tether 545 is provided that couples the terminal end 526 of airbag inflation tunnel 520 to an interior surface of airbag cushion 510 at stitch line 528. Of course, terminal tether 545 may be coupled to airbag cushion 510 by alternative means if desired. Preferably, terminal tether 545 is coupled to a region of airbag cushion 510 that is directly opposite that of inflator 50 such that, in some embodiments, the location of this coupling 528 is at a center location, or at least approximately a center location, of airbag cushion 510. In addition, terminal tether 545 is coupled to an inner surface of airbag cushion 510 directly opposite from inflator 50 such that tether 545 is at least substantially aligned with a central axis of inflation tunnel 520 during inflation of airbag cushion 510, as shown in FIG. 5.

Assembly 500 is otherwise similar to the previously-depicted embodiments. For example, airbag inflation tunnel 520 again comprises a plurality of directional vent openings 522 positioned within the airbag inflation tunnel 520, which are configured to direct inflation gas laterally relative to inflator 50. Also, airbag inflation tunnel 520 and vent openings 522 are configured such that the inflation gas is at least substantially prevented from directly contacting a portion of the airbag cushion 510 directly opposite from inflator 50, due to closed terminal end 526. Inflation tunnel 520 is therefore configured such that the inflation gas contacts terminal end 526 of inflation tunnel 520 prior to exiting the plurality of directional vent openings 522.

Assembly 500 may further comprise one or more lateral tethers, such as tethers 540a and 540b, which may be coupled to a lateral surface of the inflation tunnel 520 at one end and a lateral, internal surface of airbag cushion 510 at an opposite end.

In some embodiments, assembly 500 may further comprise a cover 550, which may comprise a tear seam 555. As previously mentioned, airbag cushion 510 may be positioned within cover 550 such that the inflation tunnel 520 will contact tear seam 555 upon deployment of the airbag cushion 510 to facilitate desired separation of tear seam 555.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag cushion assembly, comprising:
   an airbag cushion comprising an inflator opening;
   an airbag inflation tunnel coupled to the airbag cushion about the inflator opening, wherein the inflation tunnel is configured to direct inflation gas from an inflator positioned within the inflator opening down the airbag inflation tunnel upon deployment of the inflator, and wherein the inflation tunnel is configured to at least substantially prevent the inflation gas from being directed laterally within the airbag cushion immediately adjacent to the inflator such that at least a majority of the inflation gas must travel within the airbag inflation tunnel upon deployment of the inflator prior to entering a primary inflation chamber of the airbag cushion; and
   a plurality of directional vent openings positioned within the airbag inflation tunnel, wherein the plurality of directional vent openings are configured to direct inflation gas laterally relative to the inflator, wherein the inflation tunnel is configured such that at least a majority of the inflation gas contacts a terminal end of the inflation tunnel prior to exiting the plurality of directional vent openings, wherein at least a subset of the plurality of directional vent openings are evenly distributed from a cross-sectional view of the inflation tunnel taken perpendicular to an elongated length of the inflation tunnel, and wherein the plurality of directional vent openings comprises:
      a first set of vent openings extending along the length of the inflation tunnel;
      a second set of vent openings extending along the length; and
      a third set of vent openings extending along the length, wherein the first set of vent openings is spaced from the second set of vent openings by at least about 120 degrees from the cross-sectional view, wherein the second set of vent openings is spaced from the third set of vent openings by at least about 120 degrees from the cross-sectional view, and wherein the third set of vent openings is spaced from the first set of vent openings by at least about 120 degrees from the cross-sectional view.

2. The airbag cushion assembly of claim 1, wherein the inflation tunnel comprises a base, and wherein the base is configured to define a full perimeter adjacent to the inflator so as to prevent the inflation gas from being directed laterally within the airbag cushion immediately adjacent to the inflator.

3. The airbag cushion assembly of claim 1, wherein the inflation tunnel is directly coupled to an inner surface of the airbag cushion.

4. The airbag cushion assembly of claim 1, further comprising a tether coupled to an inner surface of the airbag cushion and coupled to the inflation tunnel.

5. The airbag cushion assembly of claim 4, wherein the tether is coupled to an inner surface of the airbag cushion directly opposite from the inflator such that the tether is configured to be at least substantially aligned with the inflation tunnel during inflation of the airbag cushion.

6. The airbag cushion assembly of claim 1, wherein the inflation tunnel is defined by a rectangular panel.

7. The airbag cushion assembly of claim 1, wherein the inflation tunnel comprises a base and a closed tip opposite from the base, and wherein the inflation tunnel is configured such that, upon inflation of the airbag cushion, the inflation gas is forced to contact the closed tip before exiting the inflation tunnel.

8. The airbag cushion assembly of claim 1, wherein the inflation tunnel comprises a base and a tip opposite from the base, wherein the inflation tunnel comprises a length between the base and the tip, and wherein the length is between about 200 mm and about 300 mm.

9. The airbag cushion assembly of claim 1, wherein the inflation tunnel is configured such that at least substantially all of the inflation gas contacts a terminal end of the inflation tunnel prior to exiting the plurality of directional vent openings.

10. An airbag cushion assembly, comprising:
    an airbag cushion comprising an inflator opening;
    an elongated airbag inflation tunnel coupled to the airbag cushion, wherein the airbag inflation tunnel comprises a base and a tip opposite from the base along a length of the airbag inflation tunnel, wherein the airbag inflation tunnel is coupled to the airbag cushion along the base, wherein the inflation tunnel is configured to direct inflation gas from an inflator positioned within the inflator opening down the airbag inflation tunnel upon deployment of the inflator, wherein the tip comprises a first width in a direction perpendicular from the length, wherein the base comprises a second width in a direction perpendicular from the length, and wherein the second width is greater than the first width; and
    a plurality of directional vent openings positioned within the airbag inflation tunnel, wherein the plurality of directional vent openings are configured to distribute inflation gas laterally relative to the inflator and symmetrically from a cross-sectional view of the inflation tunnel taken perpendicular to the length of the inflation tunnel, and wherein the plurality of directional vent openings comprises:
       a first set of vent openings;
       a second set of vent openings; and
       a third set of vent openings, wherein the first set of vent openings is spaced from the second set of vent openings by at least about 120 degrees from the cross-sectional view, wherein the second set of vent openings is spaced from the third set of vent openings by at least about 120 degrees from the cross-sectional view, and wherein the third set of vent openings is spaced from the first set of vent openings by at least about 120 degrees from the cross-sectional view.

11. The airbag cushion assembly of claim 10, wherein the inflation tunnel is configured to at least substantially prevent the inflation gas from being directed laterally within the airbag cushion immediately adjacent to the inflator such that the inflation gas must travel within the airbag inflation tunnel upon deployment of the inflator prior to entering a primary inflation chamber of the airbag cushion.

12. The airbag cushion assembly of claim 10, wherein the inflation tunnel tapers from the base to the tip such that a width of the inflation tunnel gradually decreases from the base to the tip.

13. The airbag cushion assembly of claim 12, wherein the inflation tunnel comprises a frusto-conical shape.

14. The airbag cushion assembly of claim 10, wherein the tip comprises a closed tip.

15. The airbag cushion assembly of claim 14, wherein the inflation tunnel is configured such that, upon inflation of the airbag cushion, the inflation gas is forced to contact the closed tip before exiting the inflation tunnel.

16. The airbag cushion assembly of claim 10, further comprising a cover configured to receive the airbag cushion, wherein the cover comprises a tear seam, and wherein the airbag cushion is positioned within the cover such that the inflation tunnel contacts the tear seam upon deployment of the airbag cushion to facilitate separation of the tear seam.

\* \* \* \* \*